Jan. 25, 1966 TAKASHI ISHIDATE 3,231,875

CONVERTER FOR CONVERTING A SEMI-PERMANENT MEMORY INTO AN ELECTRICAL SIGNAL

Filed June 11, 1962 5 Sheets-Sheet 1

INVENTOR.
TAKASHI ISHIDATE

BY

OSTROLENK, FABER, GERB and SOFFEN
ATTORNEYS

INVENTOR.
TAKASHI ISHIDATE
BY
OSTROLENK, FABER, GERB and SOFFEN
ATTORNEYS

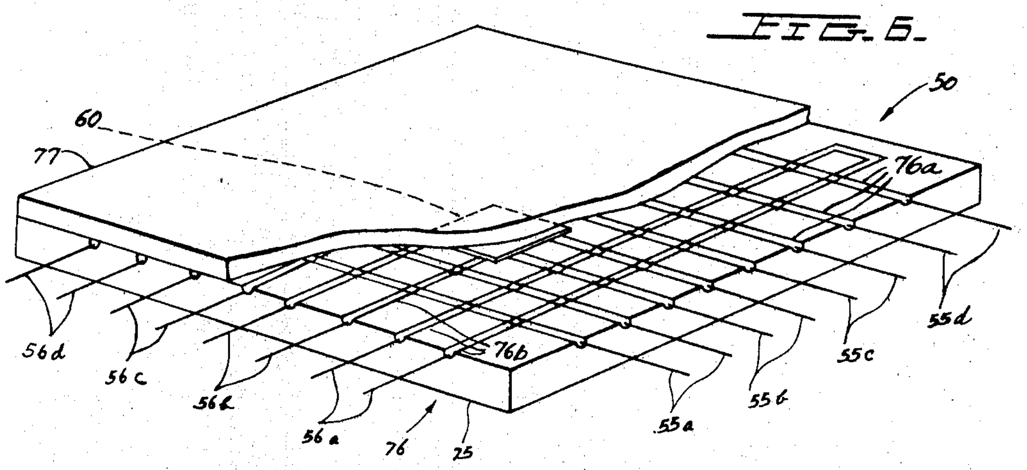
FIG. 7a
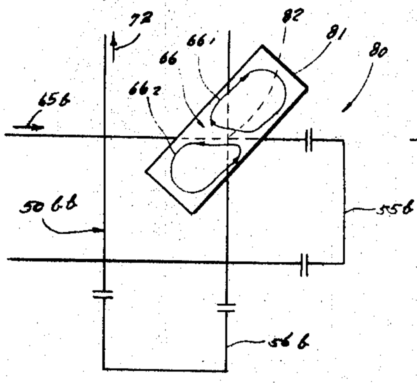
FIG. 7b
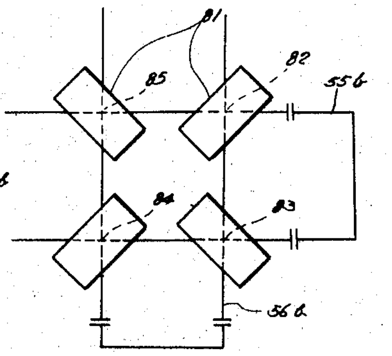
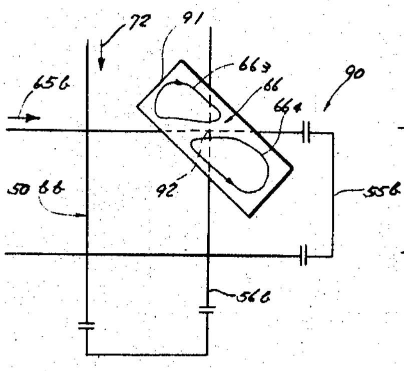
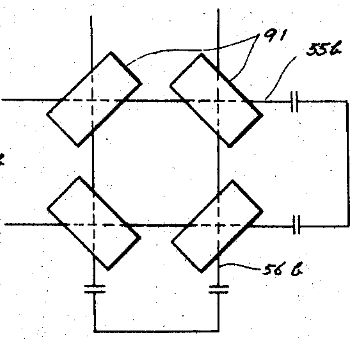
FIG. 8a
FIG. 8b
INVENTOR.
TAKASHI ISHIDATE
BY
OSTROLENK, FABER, GERB and SOFFEN
ATTORNEYS INVENTOR.
TAKASHI ISHIDATE
BY
OSTROLENK, FABER, GERB and SOFFEN
ATTORNEYS

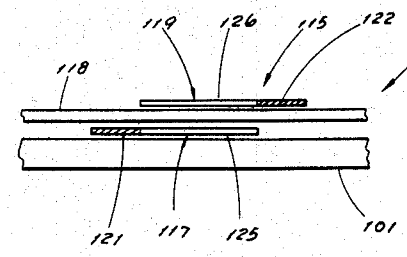
FIG. 12a
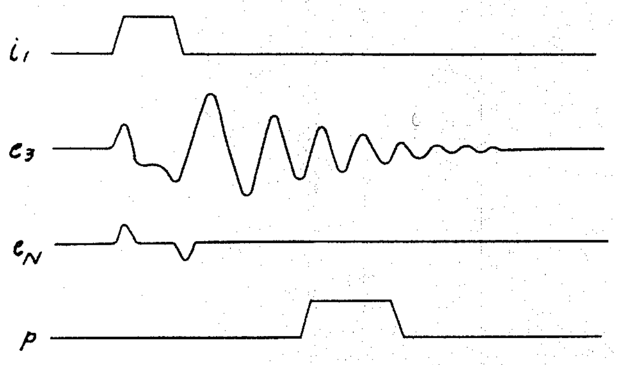
FIG. 12c
FIG. 13
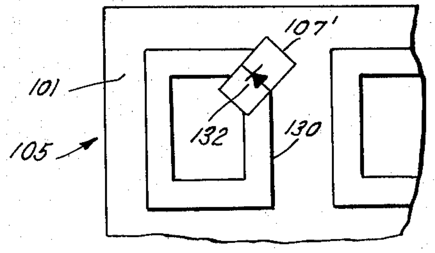
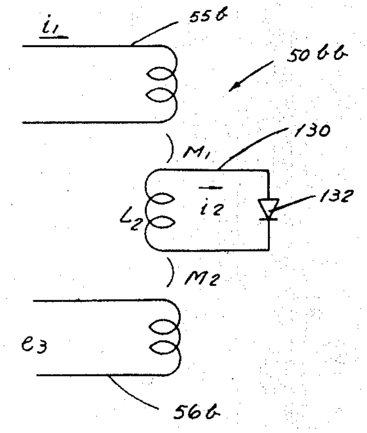
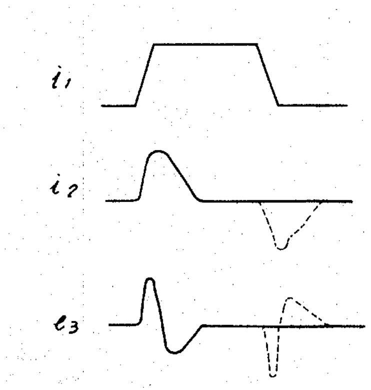
FIG. 13b
FIG. 13a
INVENTOR.
TAKASHI ISHIDATE
BY
OSTROLENK, FABER, GERB and SOFFEN
ATTORNEYS United States Patent Office 3,231,875
Patented Jan. 25, 1966

3,231,875
CONVERTER FOR CONVERTING A SEMI-PERMANENT MEMORY INTO AN ELECTRICAL SIGNAL

Takashi Ishidate, Minatoku, Tokyo, Japan, assignor to Nippon Electric Company Limited, Minatoku, Tokyo, Japan Filed June 11, 1962, Ser. No. 201,680
Claims priority, application Japan, June 22, 1961, 36/22,231; Aug. 28, 1961, 36/31,167
4 Claims. (Cl. 340—174)

This invention relates to a converter for converting a semi-permanent memory into an electrical signal, such as used in electronic telephone exchanges, computers and the like, and more particularly to a converter of the random-access-memory type adapted for use as a semi-permanent storage or an input device of the apparatus mentioned above.

A semi-permanent store is also called a semi-fixed store. In an ordinary memory storage, information can electronically voluntarily be written thereinto and read therefrom, whereas in a semi-permanent store, only reading-out is electronically performed and writing-in is generally performed in other ways such as by mechanical means, for example. Although an ordinary memory storage can be used as a semi-permanent store if the memory is never erased, a semi-permanent store is more economical and preferable in cases where the writing-in operation may take a substantially long period of time, and in case the memory once stored is to be kept unaltered for a long while.

In contrast, the memory of a permanent store is stored by fixed wiring, for example, and can hardly be changed once stored, whereas in a semi-permanent store, the memory can relatively easily be changed or be erased and subsequently written-in.

Memories are classified into two types according to the method of reading-out. One is cyclic memory, such as a tape recorder and a magnetic drum, wherein the memory can not be read out until the desired store or address is reached. The other is random-access memory such as a ring translator and a core matrix memory, wherein the memory can be read out at once by selecting the appropriate address where the desired information is stored. Inasmuch as in cyclic memory wherein the desired address is searched for successively from the beginning, the selectors are simple and a memory storage of large capacity can easily be manufactured. However, it is possible to substantially shorten the waiting time with a random access memory of the semi-permanent store wherein the desired memory is read out according to the address thereof. Such a semi-permanent store serves advantageously in an electronic telephone exchange as a code converter between the subscriber's number and the address within the exchange, or the switch number; and in an electronic computer as a memory storage for sub-routines and constants used repeatedly throughout the machine operation.

Another use for a semi-permanent store is as an input facility which is used for converting numbers, orders, and the like which are stored by code combinations in a card or tape into an electrical signal for use in an electronic telephone exchange or a computer.

As has been described, a semi-permanent store and an input facility have a common feature in that both convert, in compliance with an electrical signal supplied thereto, to an output electrical signal the memory stored therein by a non-electrical way such as, for example, by punching a card or placing conductive coatings upon a card.

Conventional random-access-memory converters, however, have complicated construction such as will be described hereunder with reference to the accompanying drawings and are accordingly high-priced.

The invention is based on the fact that while two conductor wires which cross each other substantially perpendicularly have hardly any mutual magnetic or electrostatic coupling as they are, they are electromagnetically coupled to each other when a medium, such as a conductor piece, for causing electromagnetic disturbance is disposed adjacent the cross point so that an electric current which varies with time and which is caused to flow in one of the wires may induce in the other of the wires an induced current which is of the waveform of the second derivative of the first-mentioned electric current. The invention provides, based on such a principle, a converter of the kind wherein the presence of such a medium can be read-out as an electrical signal and the absence thereof as no electrical signal. More particularly, the shape and relative position of the conductor piece are so selected that an electromagnetically induced current may flow therein and may vary in accordance with the variation of the magnetic flux which is produced by the electric current sent through one of the wires and that an electromagnetically induced electrical signal may be obtained in the other of the wires varying in accordance with the variation of the magnetic flux which is generated in turn by the induced current.

According to an aspect of the invention, the shape of the conductor piece is so shaped as to facilitate the writing-in.

According to another aspect of the invention, the conductor piece is so formed as to raise the signal-to-noise ratio of the output electrical signal and yet as to facilitate the writing-in.

It is, therefore, one object of the invention to provide a converter of the semi-permanent kind which is simple in construction and is consequently low-priced.

Another object of the invention is to provide a converter of the kind by which three-value information can be converted to three-value electrical signals.

Still another object of the invention is to provide a converter of the kind in which the information can easily be written-in.

A further object of the invention is to provide a converter of the kind in which the output electrical signal has high signal-to-noise ratio.

Another object of this invention is to provide a conversion means of the semi-permanent type which includes means for readily altering the conversion means output signal.

These and other objects become apparent when reading the accompanying disclosure and drawings, in which:

FIGURES 1 and 2 are schematical diagrams of conventional converters of the semi-permanent kind.

FIGURE 2*a* is an enlarged perspective view of a portion of the converter of FIGURE 3.

FIGURE 3 is a schematical plan view of an embodiment of this invention.

FIGURES 4*a* and 4*b* are enlarged schematical views of two cross points of the driving wires and read-out wires in the embodiment of FIGURE 3.

FIGURE 6 is a schematical perspective view of the embodiment shown in FIGURE 3.

FIGURES 7*a*, 7*b*, 8*a*, and 8*b* show second and third embodiments respectively of the invention and modifications thereof.

Figure 9:
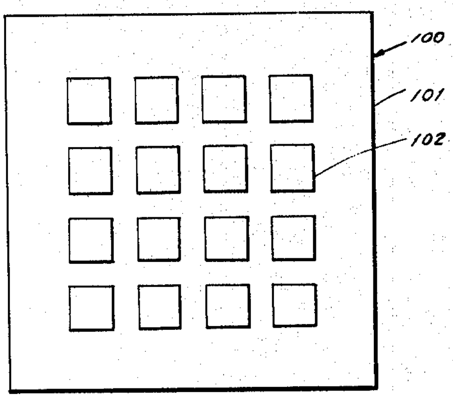

FIGURE 9 is a back plan view of a card having stored information for use in a converter of the invention.

Figure 10:
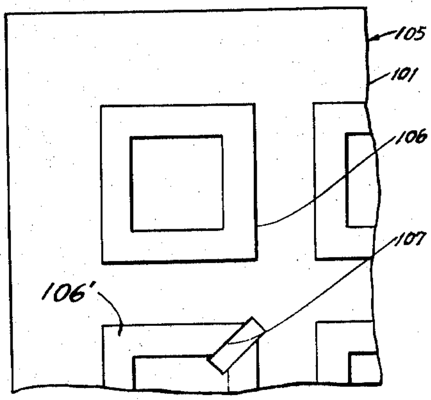

FIGURE 10 is an enlarged partial plan view of a card, showing another alternative embodiment thereof.

Figure 4A:
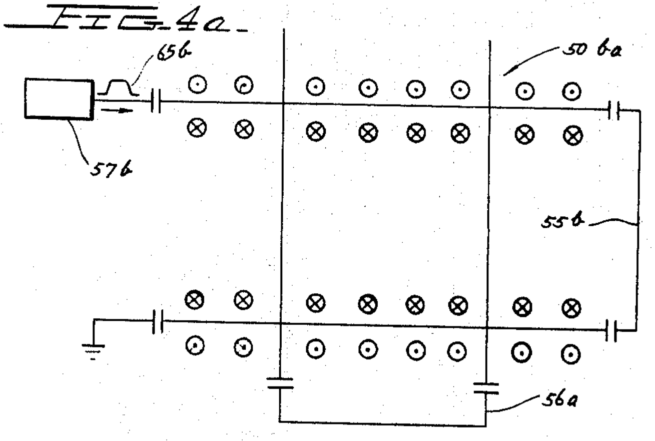
Figure 4B:
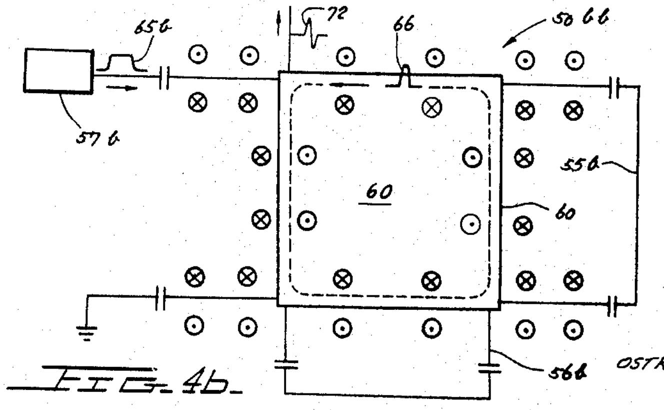
Figure 11:
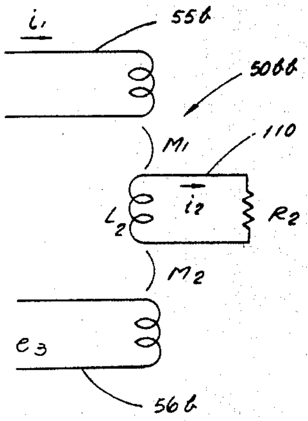

FIGURE 11 is a circuit diagram of the elements of a cross point similar to that shown in FIGURE 4*b*.

Figure 12B:
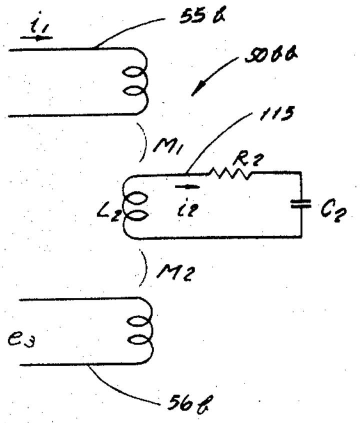
Figure 12:
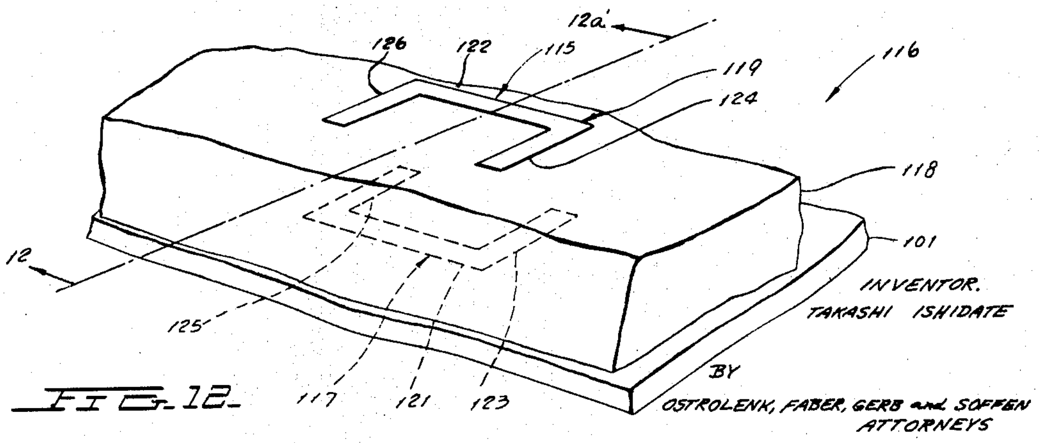

FIGURE 12 is a perspective view of another embodiment of the invention.

FIGURE 12*a* shows a schematic diagram of the embodiment of the invention, shown in FIGURE 12.

FIGURE 12*b* is a circuit diagram of the elements of a cross point of the type shown in FIGURE 12.

FIGURE 12*c* shows waveforms obtained at several positions of the converter of the invention.

FIGURE 13 shows still another embodiment of the invention.

FIGURE 13*a* shows a schematic diagram of the embodiment of FIGURE 13.

FIGURE 13*b* shows the waveforms employed in describing the circuit of FIGURE 13*a*.

Before explaining the embodiments of the instant invention, some of the conventional converters of the semi-permanent kind will first be described with reference to FIGURES 1, 2 and 2*a*.

Figure 1:
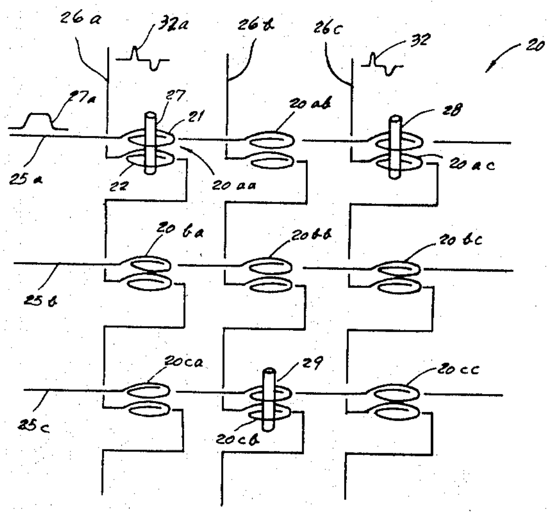

One of such conventional converters is disclosed in Proceeding of the I.E.E., Part B, November 1960 issue, pp. 567–572, under the title of "A Digital Computer Store With Very Short Read Time." As shown in FIGURE 1, the converter 20 comprises a pair 20*aa* of coils which is composed of two coils 21 and 22 having a common axis, similar coil pairs 20*ab*, 20*ac*, . . ., 20*ba*, 20*bb*, 20*bc*, . . ., 20*ca*, 20*cb*, . . . which all are disposed in rows and columns, a driving wire 25*a* which serially connects the coil 21 and the corresponding coils in a line of coil pairs 20*aa*, 20*ab*, 20*ac*, . . ., similar driving wires 25*b*, 25*c*, . . . which serially connect the corresponding coils in the other respective lines of coil pairs 20*ba*, 20*bb*, 20*bc*, . . ., 20*ca*, 20*cb*, 20*cc*, . . ., and the like, a read-out wire 26*a* which connects in series the coil 22 and the corresponding coils in a column of coil pairs 20*aa*, 20*ba*, 20*ca*, . . ., and similar read-out wires 26*b*, 26*c*, . . . which serially connect the coils which are not connected by the driving wires 25*a*, 25*b*, 25*c*, . . . in the other respective columns of coil pairs 20*ab*, 20*bb*, 20*cb*, . . ., 20*ac*, 20*bc*, 20*cc*, . . ., and the like. By putting one or a plurality of magnetically coupling members such as the ferrite rods 27, 28, 29 into the desired one or a plurality of the coil pairs such as, for example, coil pairs 20*aa*, 20*ac*, 20*cb*, magnetic couplings are increased in the coil pairs having the ferrite rods between the coils composing such coil pairs, with the result that the magnetic couplings are increased between the driving and read-out wires passing through such coil pairs. The result is, therefore, that by supplying a desired driving wire 25*a*, for example, with a driving current 31*a* of nearly rectangular waveform, read-out voltages 32*a* and 32*c*, in the instant case, which vary in pulse-like forms at the leading and trailing edges of the driving current 31*a* can be obtained in the read-out wires 26*a* and 26*c* that pass through the coil pairs which the driving current flows through and furthermore in which the ferrite rods are inserted. Thus, the converter 20 can convert into an electrical signal the conditions given by putting the ferrite rods into the coil pairs which are disposed at the cross points of the driving wires 25*a*, 25*b*, 25*c*, . . . and the read-out wires 26*a*, 26*b*, 26*c* . . . .

Figures 2, 2A:
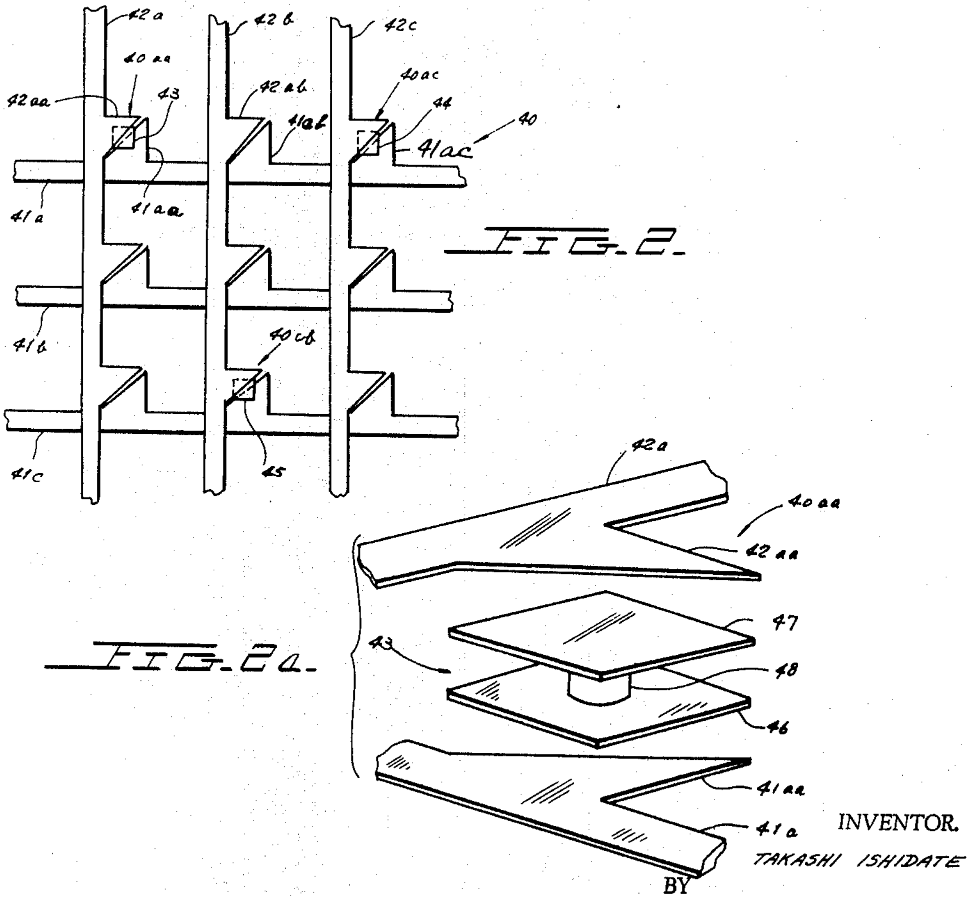

Another conventional converter of the kind was published at the Conference on Electronic Telephone Exchange held in London, November 22–24, 1960, under the title of "The Capacitive Semi-Permanent Information Store and its Uses in Telephone Exchanges." As shown in FIGURE 2, the converter 40 comprises a driving plate 41*a* which is of a strip form and which is possessed at equal intervals of projections 41*aa*, 41*ab*, 41*ac*, . . . having sides which form 45° angles with the body portion 41*a*, respectively, similar driving plates 41*b*, 41*c*, . . ., and read-out plates 42*a*, 42*b*, 42*c*, . . . which are of the same shape as the driving plates, which driving and read-out plates are disposed on the respective planes so that the 45° sides of the projections 41*aa*, 41*ab*, and the like of the driving plates and the corresponding sides of the projections 42*aa*, 42*ab*, and the like of the read-out plates may be on planes that are parallel to the aforementioned planes. Referring now to FIGURE 2*a* which is an exploded enlarged view of a cross point 40*aa*, for example, there is a capacitive forming piece 43 between the projections 41*aa* and 42*aa* which are present at the cross point 40*aa*. In FIGURE 2, similar capacitive pieces 44 and 45 are disposed at cross points 40*ac* and 40*ab*, respectively. Turning now back to FIGURE 2*a*, the capacitive piece 43 comprises two conductor plates 46 and 47 whose outer surfaces contact through dielectric layers (not shown) with the inside surfaces of the projections 41*aa* and 42*aa* of the driving and read-out plates, respectively, and a short conductor rod 48 which integrally conductively connects the two conductor plates 46 and 47. Although the dielectric layers may be formed on the inside surfaces of the driving and read-out plates, they are preferably formed on the outside surfaces of the conductor plates 46 and 47 in favor of the electrostatic coupling. At a cross point having such a capacitive piece 43, the electric capacity and accordingly the electrostatic coupling increases between the driving and read-out plates. The converter 40, therefore, can convert into an electrical signal the conditions for any pattern in which the capacitive pieces are positioned between the projections of the driving plates 41*a*, 41*b*, 41*c*, . . . and the read-out plates.

As has been described, conventional converters of the aforementioned kind are complicated in construction, difficult to manufacture, and high in cost, because either coils 21 and 22 or projections 41*aa* and 42*aa* must be formed at a cross point.

Figure 3:
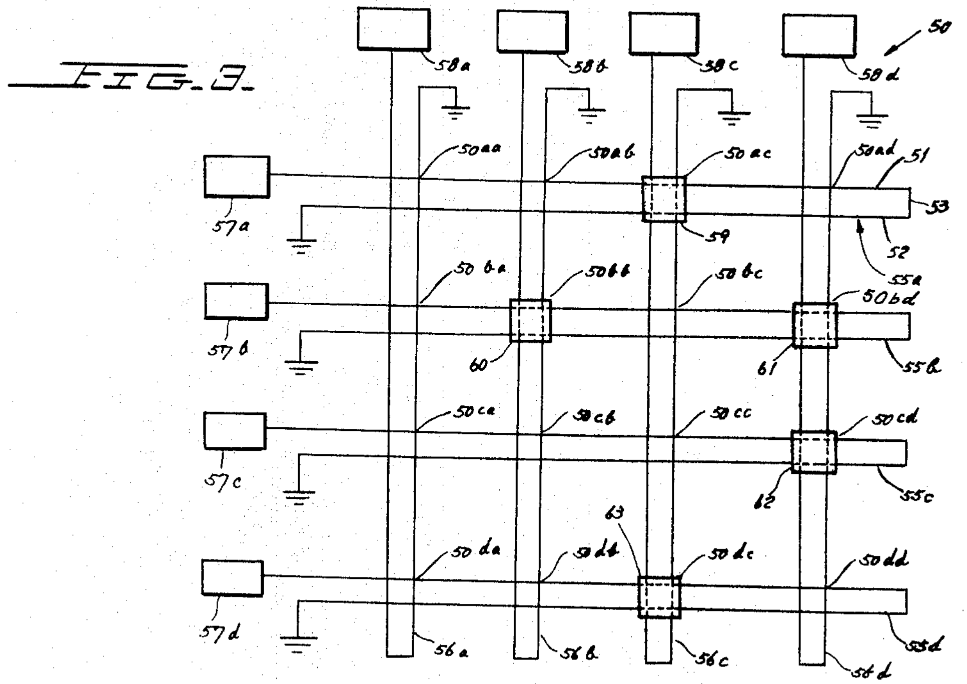

Referring now to FIGURE 3 which is a schematic plan view of a converter of the invention, the converter 50 which is illustrated as a four-address four-bit converter, comprises a driving wire 55*a* which in turn is either composed of two substantially parallel wires 51 and 52 with their ends short-circuited by a short wire 53 or alternatively composed of a wire bent into such a form, similar driving wires 55*b*, 55*c*, and 55*d* which are successively disposed on a plane in parallel relation to the driving wire 55*a*, and read-out wires 56*a*, 56*b*, 56*c*, and 56*d* which are similarly composed and successively disposed in another parallel plane so as to cross at cross points 50*aa*, 50*ab*, 50*ac*, 50*ad*, 50*ba*, 50*bb*, and the like with the driving wires 55*a*, 55*b*, 55*c* and 55*d* being in insulated relation to the driving wires. The driving wires represent the respective addresses of the semi-permanent memory stored in the converter. One end of each driving wire 55*a*, 55*b*, 55*c*, or 55*d* is grounded, while the other end is connected to a driving source 57*a*, 57*b*, 57*c* or 57*d* which may be a driving pulse source of any suitable type. By selecting one of the driving pulse sources that corresponds to the address of the desired memory to be read-out and by setting the source into operation, the driving source sends out through the driving wire having the selected address a nearly rectangular driving pulse which will later be described with reference to FIGURE 5*a*. Such driving pulse sources will not be explained any further, because they are disclosed, for example, in Electronics magazine, published October 1957, pp. 162–167, under the title of "High Speed Computer Stores 2.5 Megabits," and more particularly in FIGURE 8A thereof. Similarly, one end of the read-out wire 56*a*, 56*b*, 56*c*, or 56*d* is grounded, while the other end thereof is connected to an electric signal utilizing device 58*a*, 58*b*, 58*c*, or 58*d* such as a read-out amplifier of the class A type, for example, for amplifying to several volts the electrical signal of several millivolts obtained in any of the read-out wires and for facilitating connection of the read-out wire to each external utilization circuit (not shown) such as an instruction register, for example. At one side of the desired one of the cross points 50*aa*, 50*ab*, . . ., 50*ba*, . . . of the driving wires 55*a*, 55*b*, 55*c* and 55*d* and the read-out wires 56*a*, 56*b*, 56*c*, and 56*d*, a conductor medium 59, 60, 61, 62, 63, or the like is disposed being insulated from either of the wires, which is composed of a plate-shaped or flat conductor piece of preferably a square or a square-frame shape and of sufficient dimensions to cover the cross point.

Figure 5:
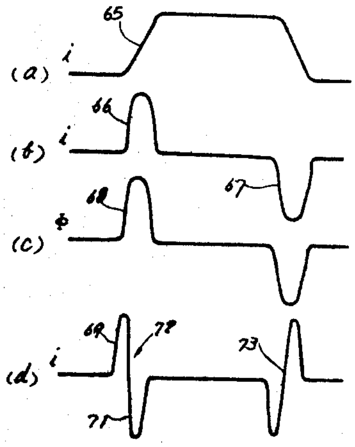
FIGURE 5 shows electrical wave-forms obtained at several positions of the converter of the invention and also the change in magnetic flux at these positions.

Referring to FIGURES 4*a* and *b* showing enlarged schematical views, respectively, of a cross point **50*ba* at which no conductor medium is disposed and another cross point 50*bb* having a conductor medium 60, a driving pulse 65** shown in FIGURE 5*a* flows through the driving wire **55*b* from the driving pulse source 57*b* producing around the driving wire a magnetic field in accordance with the clockwise screw or right-hand rule relation. In the case where the conductor medium is not disposed at the cross point, there is no difference in the magnetic flux distribution in both the inside and outside of an area substantially circumscribed by the wires 55*b* and 56*a* at the cross point 50*ba*, with the result that the wires 55*b* and 56*a* are not magnetically coupled. The flux distribution at the cross point 50*bb* having the conductor medium 60, however, is different; inasmuch as the variation in the magnetic flux caused by leading and trailing edges of the driving pulse 65 induces in the conductor medium 60 a circulating flow of an induced current so as to impede such variation, or more particularly, a circulating flow of either an induced current 66** shown in FIGURE 5*b* formed during the leading edge of pulse 65 and in the opposite sense to the driving current 65 so as to cancel the current build-up or another induced current 67 shown in FIGURE 5*b* formed during the period of the trailing edge of pulse 65, and in the opposite sense, as the driving current 65, so as to prevent current decay, it follows upon build-up of the driving current 65 that the magnetic flux inside the above-mentioned loop transiently decreases along the driving wire **55*b*** as compared with the flux outside and that magnetic flux such as shown in FIGURE 5*c* having a pulse-like waveform 68 is transiently produced along the portions of the read-out wire **56*b* that are within the loop. The transient magnetic flux 68 in turn produces in the read-out wire 56*b*, a read-out current portion 69, upon production of the magnetic flux, in the sense so as to cancel the appearance of the magnetic flux or, in the opposite sense to the induced current 66; and another succeeding read-out current portion 71*b*, upon decay of the magnetic flux to zero, in the sense for impeding the disappearance of the magnetic flux or in the same sense as the induced current 66. Thus, it will be appreciated when the driving pulse 65 is developed in the driving wire 55*b* that no read-out current is obtained in the read-out wire 56*a* which has no conductor medium at the cross point 50*ba* thereof, while a read-out current 72 consisting of the read-out current portions 69 and 71 forming an output signal which is an electrical signal of several millivolts, is obtained in the read-out wire 56*b* having the conductor medium 60 at the cross point 50*bb*. This occurs upon build-up of the driving current 65. A similar read-out current 73 is formed upon the decay of the driving current 65. The converter of the invention can, therefore, read out in a series of read-out wires as a series of electrical signals of a form determined by the pattern in which the conductor media are disposed at cross points of the driving and read-out wires. Incidentally, the senses of the general read-out current pulses 72 and 73 are shown in FIGURE 5, by taking the positive senses thereof in the sense of the electric current which flows in virtually continuous circulating relation to the driving current through the read-out wire portions crossing the driving wire, with the result that the sense of the read-out current portion 69 is shown the same as those of the induced current 66 and the magnetic flux 68**.

Referring now to FIGURE 6 which is a perspective view of the converter 50 of the invention, the converter 50 comprises a converter panel 76 which in turn comprises an insulator plate 75 having perpendicularly aligned grooves **76*a* and 76*b* for receiving driving wires 55*a*, 55*b*, 55*c* and 55*d* and read-out wires 56*a*, 56*b*, 56*c* and 56*d* respectively which are shown in FIGURE 3 and a juxtaposed insulator card 77 which, in turn, is possessed of the conductor medium 60 embedded therein or coated thereon in accordance with the information to be stored. It should be understood that the grooves 76*b* are deeper than the grooves 76*a* so as to electrically insulate the wires 56*a*–56*d* from the wires 55*a*–55*d*. Ordinarily, the converter panel assembly 76 is fixed to an electronic exchange or computer and the card 77 which is selected in compliance with the usage, such as the sort of computation, is disposed in juxtaposition. It should be understood that a greater number of conductor media may be employed on card 77** and may be arrayed in any desired pattern.

Referring to FIGURE 7*a* which is a schematic and partial plan view of another embodiment of the invention, the converter 80 comprises, in place of the conductor medium 60 of the first embodiment, a conductor medium 81 of a strip-like form, such as a rectangular or an elliptical plate, disposed at a cross point 82 of any one branch of each of the driving and read-out wires out of the general cross point **50*bb*, for example, of the driving wire 55*b* and read-out wire 56*b* so that the conductor 81 may cross, electrically insulated from the wires, the branches preferably at an angle of 45° and that one end thereof may be disposed inside the above-mentioned loop formed by the driving and read-out wires. The induced current 66 flowing, in the manner explained with reference to FIGURE 3, in the conductor 81 due to the driving pulse 65, is composed of two portions $66_1$ and $66_2$ flowing so as to substantially circumscribe two portions of the conductor 81 which are divided by a virtual line which is the projection onto the conductor 81 of the driving wire branch 55*b* passing through the cross point 82. Inasmuch as such induced current portions $66_1$ and $66_2$ cross the read-out wire branch passing through the cross point 82 at angles of 90° and 45°, the induced current portions can in turn induce in the read-out wire branch 56*b*, on crossing the same at 45°, read-out current portions in the reversed sense, upon the build-up of the driving pulse 65, to the projection of the induced current portions onto such branch, with the result that read-out currents 72 and 73 flow in the read-out wire 56*b*** in the same sense as the embodiment shown in FIGURE 3.

As shown in a modification illustrated in FIGURE 7*b*, such conductor media 81 may be placed, electrically insulated from one another, at all or any of four cross points 82, 83, 84 and 85 formed by the respective branches of the driving wire **55*b* and read-out wire 56*b***, for example. In such a modification, a considerably large read-out current is obtainable because of the superposition of all four of the conductor mediums on each other.

Referring to FIGURE 8*a*, which shows still another embodiment of the invention in the manner of FIGURE 7, the converter 90 comprises a conductor medium 91 of a form similar to that shown in FIGURE 7*a* disposed at a cross point 92 of any one each of the driving and read-out wire branches out of the general cross point **55*bb*, for example, of the driving wire 55*b* and read-out wires 56*b* so that the conductor 91 may cross, electrically insulated from the wires, the branches preferably at an angle of 45° and that both ends thereof may be disposed outside of the aforementioned loop. As has been explained in connection with the embodiment shown in FIGURE 7, the induced current 66 consisting of two portions $66_3$ and $66_4$ is caused to flow in the conductor 91 by the driving pulse 65*b*. Inasmuch as the induced current 66 has its circulating portions crossing at an angle of 45° the read-out wire branch passing through the cross point 92, a read-out current portion is induced in turn in the branch 56*b* in the opposite sense, upon the build-up of the driving pulse 65, due to the coupling of the circulating portions with the output branch, with the result that the read-out currents 72 and 73** (see FIGURE 5*d*) are obtained in the read-out wire or branch **56*b***. The senses of the read-out currents are opposite to those in the case shown in FIGURE 7*a*, because if the angle between the branch of the read-out wire and the induced current parts obliquely crossing the branch is considered as $+45°$ in the embodiment of FIGURE 7*a*, the angle is $-45°$ in the case of FIGURE 8*a*.

In a modification shown in FIGURE 8*b* of the last-described embodiment, a plurality of such conductor media 91 are disposed, in a manner similar to the modification shown in FIGURE 7*b* and in the way explained in connection with the embodiment of FIGURE 8*a*. Also in the modification, superposition of the functions of the conductor media results in a large composite read-out current.

It will be noticed that the senses or polarities of the read-out currents differ in the embodiments of FIGURES 7 and 8 and that no read-out current is obtained in both embodiments in which a read-out wire passing through a cross point at which no conductor medium is disposed. It will, therefore, be appreciated that it is possible according to the invention to convert three kinds of information such as "positive," "zero" and "negative" current into the corresponding three kinds of electrical signals by disposing a conductor media in accordance with the embodiment shown in FIGURE 7, no conductor media, and a conductor media in conformity to the embodiment shown in FIGURE 8, respectively, at such cross points of the driving and read-out wires that are selected in compliance with the conversion information to be stored. Furthermore, it is possible with the embodiments of FIGURES 7 and 8 to selectively produce read-out pulses of varying intensity and sign or polarity of the read-out current by varying the shapes of the strip-like conductor media; the distances between the conductor media and the associated cross points; the angles between the axes of the conductor media and the respective driving or read-out wires; and the number of conductor media employed at each cross point.

Turning now to FIGURE 9, there is shown a rear plan view of a card 100 which may be used in place of the card 77 shown in FIGURE 6; the card 100 comprises a thin insulator plate 101, such as a sheet of paper used in the punch cards employed in computers or a film of epoxy resin, on which conductor pieces 102 of identical square shapes are printed or otherwise attached. It will be understood that each of the conductor pieces 102 corresponds to the conductor medium 60 shown in FIGURES 3, 4 and 6, and that each conductor piece 102 may be alternatively replaced by the conductor media which are from one to four in number and illustrated in either FIGURES 7 or 8.

It is to be noticed here that with the card 100 the information stored in the respective bits of each address are all "1" or, in other words, output electrical signals are obtainable in all of the read-out wires whichever of the driving wires may be excited. In order to store a "0" information at a particular bit of a particular address or to make no output electrical signal obtainable in a particular read-out wire even if a particular driving wire may be excited, it is only necessary with the shown card 100 to remove from the insulator plate 101 the corresponding conductor piece 102 chemically, mechanically, or otherwise. Chemical removal, however, requires a drastic reagent such as concentrated nitric acid. Mechanical removal, on the other hand, often weakens the mechanical strength of the card 100. In a preferred card, therefore, the conductor pieces 102 are possessed of identical square-frame shapes (as shown in FIGURE 10).

Referring to FIGURE 10 which is a partial back plan view of a preferred card 105, each of the matrix-wise disposed conductor pieces 106 thereof has a square-frame shape in place of the solid square shape of the conductor piece 102 shown in FIGURE 9. Such a conductor piece 106 similarly produces electromagnetic disturbance as a square-shaped conductor piece 102, because the circulating induced current generally flows adjacent the margin thereof. With a card 105 having such square-frame-shaped conductor piece, a "0" information can easily be written in by punching at a desired portion of the square frame a hole such as the hole 107, which is shown in FIGURE 9 in a rectangular shape as is the case with a punch card of the type employed in computers, such as to cut off the continuity of the frame. Incidentally, while mere cutting off of a marginal portion of a square-shaped conductor piece does not result even in appreciable reduction of the circulating induced current, because such current can flow in the irregularly-shaped cut-off conductor piece along the general circumference thereof, the eddy current flow in the square-frame conductor 106' is substantially zero.

A square-frame-shaped (or generally ring-shaped conductor) piece (not shown) is the type employed in the following electrical circuit analyses of the converter of the invention.

Referring to FIGURE 11 which shows a circuit diagram of a cross point **50*bb* of a driving wire 55*b* and a read-out wire 56*b* with a frame- or ring-shaped conductor piece 110 in lieu of the square conductor medium 60** shown in FIGURE 4*b*, the relations between the driving pulse current $i_1$, the circulating induced current $i_2$ in the conductor piece 110, and the output electrical signal voltage $e_3$ are $$L_2 \cdot di_2/dt + R_2 i_2 = M_1 \cdot di_1/dt \tag{1}$$

and $$e_3 = M_2 \cdot di_2/dt \tag{2}$$

where $M_1$ and $M_2$ are mutual inductances between the driving wire **55*c* and the ring-shaped conductor piece 110 and between such piece and the read-out wire 56*b* respectively, $L_2$ and $R_2$ are the inductance and resistance of the ring-shaped electrical path in the conductor piece 110**, and $t$ shows time. These relations (1) and (2) make it possible to determine the output signal voltage $e_3$ from the driving pulse current $i_1$.

For instance, it will be seen from the Equation 1 that a linearly increasing driving current $i_1$ given by $$i_1 = I_1/t_1 \cdot t \tag{3}$$

where $I_1$ and $t_1$ are constants, results in an induced current $i_2$, if such input current is zero at $t=0$, given by $$i_2 = M_1 I_1/(R_2 t_1) - M_1 I_1/(R_2 t_1) \cdot \exp(-R_2/L_2 \cdot t)$$

where $\exp(x)$ is the exponential function of $x$. Therefore, the Equation 2 reduces to $$e_3 = M_1 M_2 I_1/(L_2 t_1) \cdot \exp(-R_2/L_2 \cdot t) \tag{4}$$

which Equation 4 shows that the duration of the output signal voltage $e_3$ depends upon a time constant $L_2/R_2$ as small as possible as by either choosing a material of high specific resistance or providing the square or the ring-shaped conductor piece with a portion of concentrated resistance in any suitable manner.

Referring to FIGURE 12*b* which shows a circuit diagram of a cross point **50*bb* with another ring-shaped conductor medium 115 of the type shown in FIGURE 12, the conductor medium 115** is provided with an effective capacitance $C_2$ with a view to raising the signal-to-noise ratio of the output electrical signal. Such a conductor medium can be realized as is, for example, in FIGURES 12 and 12*a* which are a partial perspective view and a partial vertical sectional view taken on line **12*a*–12*a'* of FIGURE 12, respectively, of another information card 116. More particularly, the thin insulator plate 101 of the card 116 has a thin conductor piece 117 positioned thereon, which is of a channel shape or generally of a U-shape and may be formed by evaporation of silver, aluminium, or the like through a mask (not shown) onto the insulator surface 101. A thin insulator film 118 which is shown in FIGURE 12 greatly exaggerated in thickness and may be formed by evaporation of an insulator material onto the surface of the insulator plate 101 and of the conductor pieces 117. Another thin conductor piece 119 which is of the identical shape as the first-mentioned conductor piece 117 with their faces 121 and 122 in laterally disposed parallel relation to each other and with their arms 123, 124, 125, and 126 in juxtaposed relation such that the arms 123 and 125 of the first conductor piece 117 and the arms 124 and 126 of the second conductor piece 119 form two capacitors having a commonly interposed dielectric or insulator film 118 and which may be formed in the similar manner on the outside surface of the insulator film 118 as the first conductor piece 117. A "0" information can be written into such an information card 116 by the aforementioned punching-off or otherwise removing-off of a portion of the conductor piece 117 or 119 or both, such as the bottom 121 of the generally U-shaped first conductor piece 117**, for example.

Referring to FIGURE 12*c* which shows waveforms at different portions of a converter of the invention wherein the conductor media 115 with capacitors are used, application of a driving pulse current $i_1$ shown to the driving wire **55*b* shown in FIGURE 12 induces in the conductor medium 115 a circulating current of damped oscillation whose general frequency is determined by the capacity of the capacitor $C_2$ and the inductance $L_2$ of the conductor medium 115. The current induced in the conductor medium 115 in turn induces in the read-out wire 56*b*** shown in FIGURE 12 an electrical signal voltage $e_3$ of the shown waveform. It is to be noted here that a noise voltage $e_N$ which would be induced at a cross point having no conductor medium, or having a conductor medium with a removed portion, is produced only during the leading and/or trailing edge portions of the driving pulse current $i_1$, as shown. It will therefore be appreciated that the signal-to-noise ratio of the output electrical signal can be remarkably increased by gating at the electrical signal utilizing device such as shown in FIGURE 3 the signal voltage $e_3$ with a gating pulse $p$ which sufficiently lags behind the driving pulse current $i_1$ as shown in FIGURE 12*c*, to make use of a gated output electrical signal (not shown). This may be done by impressing the gating pulse $p$ (of FIGURE 12*c*) and the output signal $e_3$ upon the inputs of a suitable 2-input AND gate which is adapted to generate an output signal upon the simultaneous presence of signals $p$ and $e_3$.

Turning ultimately to FIGURES 13, 13*a* and 13*b* which show a card, a circuit diagram of a cross point **50*bb* with another conductor medium 130 and waveforms at different parts of a converter according to another aspect of the invention, the conductor medium 130 of a cut-off ring-shape formed by slot 1071 is provided with a rectifier 132 connecting the edges of the frame facing the cut-off portion so as to form a closed electrical loop circuit. With such a conductor media 130, application of a driving pulse current $i_1$ in the driving wire 55*b* induces in the conductor medium 130** a circulating current $i_2$ shown in FIGURE 13*a* by the solid line, which current $i_2$ in turn induces in the read-out wire **56*b* an electrical signal voltage $e_3$ also shown by the solid curve. The polarity and time position of the circulating induced current $i_2$ and the electrical signal voltage $e_3$ become as shown by the broken curves, if the polarity (i.e. the connections) of the rectifier 132** is reversed. According to such an aspect of the invention, it is possible therefore to substantially shorten the time between successive read-out pulses.

By virtue of the invention, wherein the driving and read-out wires are composed of straight portions only, it is possible to provide a converter which is simple in construction, easily manufacturable, and accordingly low in price.

With the generally frame-shaped or ring-shaped conductor media, it is possible to write-in in the card the information to be stored, with ease, with substantially the same output level, and without any disadvantage of weakening the card and also possible to permit easy installation of circuit elements such as resistors, capacitors, rectifiers, or the like so as to shorten the time required for recurring reading-out or to raise the signal-to-noise ratio of the output electrical signal. Furthermore, such ring-shaped conductor media can be mechanically punched as previously described to change the stored information by means of a suitable perforating device which may be operated by electromagnets, so that the converter of the invention is better adapted as the semi-permanent store for an electronic computer or exchange. It should be noted that the removed portion of such a ring-shaped conductor piece or medium may vary in form, in relative position to the conductor medium, and in number, such choice residing completely within the realm of the user.

Although only some embodiments of the invention and modifications thereof have been described in the foregoing, further embodiments and modifications thereof are apparent. For example, the driving and read-out wires need not be of lapped or folded form, need not be disposed on the respective planes, need not be equal in number, and further, need not be provided with an equal number of the driving pulse sources; the material of the conductor media may be any suitable conductive material. Also, the driving wires and read-out wires may be embedded in separate converter panels for interposition therebetween of the card having the conductor media.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Signal conversion means comprising a two dimensional matrix having a plurality of rows and columns; each of said rows and columns being comprised of a pair of spaced parallel conductors; said conductors of each of said pairs being electrically connected at a first end thereof to form a loop; signal generating means connected to the second ends of each of said row pairs; utilization means connected to the second ends of each of said column pairs; coupling means; each of said row conductor pairs and said column conductor pairs forming a substantially square-shaped intersecting area at their intersections; said coupling means being positioned substantially above said intersecting area for generating signals in the associated column pair under control of a signal in the associated row pair; said coupling means being a substantially flat square-shaped plate of conductive material exhibiting a high degree of conductivity.

2. The conversion means of claim 1 wherein said coupling means is further comprised of an insulating sheet positioned immediately above said matrix and having a plurality of said predetermined square-shaped plates deposited on said sheet, said conductive plates being arranged on said sheet to form a two dimensional matrix of rows and columns on said sheet; said sheet being positioned relative to said conductor matrix with each of said conductive layers lying immediately above an associated square-shaped intersection between a row and a column conductor; selected ones of said conductive layers being perforated to inhibit electrical coupling between the row and column conductors associated with said perforated conductive layers.

3. The conversion means of claim 1 wherein said conductive plate is a square-shaped conductive loop.

4. The conversion means of claim 3 wherein said coupling means is further comprised of an insulating sheet positioned immediately above said matrix and having a plurality of said predetermined square-shaped loops deposited on said sheet, said conductive loops being arranged on said sheet to form a two dimensional matrix of rows and columns on said sheet; said sheet being positioned relative to said conductor matrix with each of said conductive layers lying immediately above an associated square-shaped intersection between a row and a column conductor; selected ones of said conductive layers being perforated to inhibit electrical coupling between the row and column conductors associated with said perforated conductive loops, said perforations being positioned to make its associated conductive layer a discontinuous loop.

References Cited by the Examiner

UNITED STATES PATENTS

| | | | |
|---|---|---|---|
| 3,061,821 | 10/1962 | Gribble et al. ------- | 340—174 |
| 3,098,996 | 7/1963 | Kretzmer ---------- | 340—173 |
| 3,102,999 | 9/1963 | Berneymr et al. ----- | 340—174 |
| 3,130,388 | 4/1964 | Renard ------------ | 340—173 |

OTHER REFERENCES

IBM Technical Disclosure Bulletin, G. D. Bruce, vol. 3, No. 10, pages 18 and 19, March 1961.

IRVING L. SRAGOW, *Primary Examiner.*